(12) United States Patent
Razakarivony et al.

(10) Patent No.: US 10,513,345 B2
(45) Date of Patent: Dec. 24, 2019

(54) METHOD AND SYSTEM FOR MONITORING THE SOUNDNESS OF HELICOPTERS

(71) Applicants: SAFRAN, Paris (FR); SAFRAN HELICOPTER ENGINES, Bordes (FR)

(72) Inventors: Sebastien Philippe Razakarivony, Moissy-Cramayel (FR); Francois Goudet, Moissy-Cramayel (FR)

(73) Assignees: SAFRAN, Paris (FR); SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 16/342,927

(22) PCT Filed: Oct. 18, 2017

(86) PCT No.: PCT/FR2017/052864
§ 371 (c)(1),
(2) Date: Apr. 17, 2019

(87) PCT Pub. No.: WO2018/078245
PCT Pub. Date: May 3, 2018

(65) Prior Publication Data
US 2019/0337636 A1    Nov. 7, 2019

(30) Foreign Application Priority Data
Oct. 25, 2016  (FR) ..................................... 16 60356

(51) Int. Cl.
*B64D 45/00*  (2006.01)
*G07C 5/02*  (2006.01)
*G07C 5/08*  (2006.01)

(52) U.S. Cl.
CPC ............... *B64D 45/00* (2013.01); *G07C 5/02* (2013.01); *G07C 5/085* (2013.01); *B64D 2045/0085* (2013.01)

(58) Field of Classification Search
None
See application file for complete search history.

(56) References Cited

U.S. PATENT DOCUMENTS

| 9,310,222 B1 * | 4/2016 | Suiter | ................. G01C 23/005 |
| 2006/0112119 A1 * | 5/2006 | Vian | ..................... G07C 5/085 |

(Continued)

OTHER PUBLICATIONS

Written Opinion received for PCT Patent Application No. PCT/FR2017/052864, dated Dec. 8, 2017, 5 pages Original Document Only.

(Continued)

*Primary Examiner* — Richard M Camby
(74) *Attorney, Agent, or Firm* — Womble Bond Dickinson (US) LLP

(57) ABSTRACT

The invention relates to a method for monitoring the soundness of helicopters comprising the determination of the severity of a plurality of flight missions of a plurality of helicopters, comprising a step for acquiring and storing flight data from helicopter flight missions, and a step for acquiring and storing maintenance data from the plurality of helicopters. The method is characterised in that said determination comprises a mission-type construction step, comprising a sub-step for constructing descriptors, a sub-step for partitioning the descriptors and a sub-step for allocating a mission type to each flight by associating the descriptor of said flight and a sub-set, in which this descriptor is found, and a step for interpreting the severity of the mission types, comprising a sub-step for estimating the severity models, and a sub-step for associating a severity model with each (Continued)

mission type determined in the mission type construction step.

10 Claims, 1 Drawing Sheet

(56) References Cited

U.S. PATENT DOCUMENTS

2006/0180371 A1* 8/2006 Breed .................... G07C 5/008
                                                                        180/197
2010/0235108 A1    9/2010 Adams et al.

OTHER PUBLICATIONS

International Search Report received for PCT Patent Application No. PCT/FR2017/052864, dated Dec. 8, 2017, 5 pages (2 pages of English Translation and 3 pages of Original Document).

* cited by examiner

METHOD AND SYSTEM FOR MONITORING THE SOUNDNESS OF HELICOPTERS

1. TECHNICAL FIELD OF THE INVENTION

The invention relates to a method and a system for monitoring the soundness of helicopters. In particular, the invention relates to a monitoring of helicopters comprising a method and a system for determining the severity of flight missions allowing to construct flight mission types and to associate a severity to each of these flight mission types.

2. TECHNOLOGICAL BACKGROUND

During each flight, most helicopters record a set of internal and external physical data through various on-board sensors of the helicopter. This recorded data is used, when the helicopter is on the ground, to perform complementary analyses.

Furthermore, helicopters are designed and used for different kinds of missions. Each type of mission has a different influence on the state of the helicopter and the components thereof. Mission types are currently determined during the design phase of each helicopter, based on theoretical profiles determined by the manufacturer after a client consultation process. For example, mission types are grouped into large families, such as medical emergency service, utility, tourism, VIP, maritime, police, etc.

This division into types of missions has several disadvantages.

In particular, these types of mission are selected on the basis of the client's field of activity, which is not necessarily identical to the actual use made of the helicopter. For example, a tourism helicopter can have different uses depending on the rate system implemented (hourly or destination-based).

In addition, a limited number of mission types (such as the six listed), is not sufficient to represent the full range of uses.

The inventors have therefore sought a solution to these disadvantages.

3. AIMS OF THE INVENTION

The invention aims at overcoming at least some of the disadvantages of known methods and systems for determining the severity of helicopter flight missions.

In particular, the invention aims at providing, in at least one embodiment of the invention, a method and a system allowing automating the identification of the types of mission actually carried out.

The invention also aims at providing, in at least one embodiment, a method and a system to automate the association of a severity to each type of mission identified.

The invention also aims at providing, in at least one embodiment, a method and a system that allows improving the design, maintenance, and procurement of spare parts for a helicopter or any system or subsystem it comprises.

4. PRESENTATION OF THE INVENTION

For this purpose, the invention relates to a method for monitoring the soundness of helicopters comprising the determination of the severity of a plurality of flight missions of a plurality of helicopters, said determination comprising:
- a step for the acquisition and storage of mission flight data of helicopters, said flight data comprising for each flight of a helicopter, the physical data recorded by at least one sensor of the helicopter,
- a step for the acquisition and storage of the maintenance data of the plurality of helicopters, said maintenance data comprising at least the information relating to failures of the components of each helicopter and to the components that are replaced in each helicopter as a consequence of the flight missions, the method being characterised in that it comprises:
- a step for constructing the mission type, comprising:
  - a sub-step for constructing relative descriptors, wherein the physical flight data is reduced to a vector with a predetermined dimension forming a descriptor, all of the descriptors having the same dimension,
  - a sub-step for partitioning the descriptors, adapted to partition the descriptors into sub-sets forming the types of mission,
  - a sub-step for allocating a type of mission to each flight by associating the descriptor of said flight with the subset wherein the descriptor is located, and for creating a model of the types of mission associating the physical data relating to the flight to each type of mission,
- a step for interpreting the severity of the types of mission, comprising:
  - a sub-step for estimating severity models from the flight data and the maintenance data, each severity model defining an estimation of the ageing of the helicopter components based on the types of mission,
  - a sub-step for associating a severity model to each type of mission determined in the step for constructing the types of mission.

A method according to the invention therefore allows determining the types of mission based on flight missions already carried out by a plurality of helicopters and therefore to determine the types of mission based on actual uses instead of assumed uses.

The term "helicopter" is used in this application to describe a helicopter or any system or subsystem it comprises (in particular the engine(s) of the helicopter).

The association of a severity with mission types allows, for example, improving the design of helicopters, in particular by adjusting or designing engines based on the use the client makes of them, improving maintenance with advance knowledge of the estimated lifespan of the components, suggesting inspections or replacements to the client at the suitable moment, and improving the management of the procurement of spare parts for helicopter components. In particular, estimating the severity allows estimating the ageing of the components of the helicopter (in particular, the engine of the helicopter) in order to schedule maintenance operations (wear inspection, part replacement, etc.).

The physical flight data is, for example, data relating to temperature, pressure, angles, etc. Each item of physical data corresponds to a number of values measured by the associated sensors.

The severity models can be, for example, statistical models of future failures, models of the evolution of activity indicators (of the performance margin-type), or ad hoc indicators developed from the collected data.

The construction of the descriptors allows collecting these values to form, for each item of physical data, a single descriptor representing the distribution of these values for each item of physical data. The use of descriptors, which all have the same dimension, allows processing together physical data with different scopes and numbers of values.

The information relating to component failures/replacements is, for example, data comprising a part identifier (serial or record number, for example) or an identifier of the part's function (compressor, dynamic sealing, turbine disc and vane, combustion chamber, bearing, injector, etc.) and the date of the failure or replacement of the part.

Advantageously and according to the invention, the step for constructing mission types comprises a sub-step for selecting the physical data from among the flight data, prior to the sub-step for constructing descriptors, by removing the recorded physical data relating to the soundness of the helicopter engine and retaining the physical data relating to the engine use.

According to this aspect of the invention, this selection of data allows retaining only the data relating to the use of the engine, which corresponds to all of the commands made by a helicopter pilot through the control units, which are representative of the actual use made of the helicopters, and to remove all the data relating to the soundness of the engine, which are assessed through the dynamic behaviour of parameters in the course of time and/or the equilibrium between parameters that can be normal (i.e. corresponding to an expected value, and representative of sound functioning), or abnormal (deviating from normal values, therefore representative of unsound functioning). This removal step consists of removing certain variables and removing certain parts of other recorded variables.

Advantageously and according to the invention, the step for constructing the type of mission comprises a sub-step for reducing the dimension of the descriptors prior to the sub-step for allocating the types of mission, through a multivariate data analysis of the descriptors.

According to this aspect of the invention, if the dimensions of the descriptors are too big to allow for reasonable processing times, the dimensions are reduced by the implementation of a dimension reduction method.

Advantageously and according to the invention, the descriptor dimension reduction sub-step is performed with a method selected from among the following methods:
 principal component analysis,
 autoencoder method,
 ISOMAP method
 T-SNE method,
 Multi-Dimensional Scaling,
 Linear Local Embedding (also known as Locally Linear Embedding) method.

According to other embodiments of the invention, other methods for reducing the descriptors are implemented.

Advantageously and according to the invention, the step for constructing the type of mission comprises a sub-step for standardising the descriptors prior to the sub-step for partitioning the descriptors.

According to this aspect of the invention, the standardisation of the descriptors allows preparing the partitioning by using a norm (or distance) for the partitioning that is the best suited to the structure of the descriptors (vectors representing the densities of the values).

Advantageously and according to the invention, the descriptor standardisation sub-step is performed with a method selected from among the following standardisation methods:
 L1 norm,
 Wasserstein metric,
 chi-squared norm,
 Bhattacharyya distance, According to this aspect of the invention, these norms are better suited than a Euclidean distance for the descriptors according to the invention. According to other embodiments of the invention, other methods with similar advantages are used.

Advantageously and according to the invention, the partitioning sub-step performs a partitioning chosen from among the following partitioning methods:
 K-means method,
 DBSCAN method,
 mean deviation method.

According to this aspect of the invention, these various automatic partitioning methods allow obtaining consistent sub-sets that can be used to form mission types. The mission types thus obtained are more representative than mission types based on the economic activity defined according to the prior art. The mean deviation method is more commonly known as the mean shift method.

Advantageously and according to the invention, the sub-step for constructing relative descriptors comprises the creation, for each type of physical data, of a histogram comprising a predetermined number n of classes, the descriptor forming a vector of dimension n, of which each component is equal to the number of items of physical data comprised in a class of the histogram, in a range of data selected beforehand during the sub-step for the selection of physical data.

According to this aspect of the invention, the use of a histogram simply allows reducing the physical flight data with values of different orders of magnitude (order of magnitude 100 for temperature, 10000 for pressure, etc.) of with different properties (cyclical for angles) in vectors with identical dimensions forming the descriptors. Each histogram class corresponds to an interval of values (for example, temperature of between 80° C. and 90° C., pressure of between 100 hPa and 110 hPa, angle of between 0° and 30°±360°, etc.).

Another descriptor may also be the concatenation of the time spent in certain specific physical conditions (for example, time before take-off) or of specific manoeuvre counters.

The invention also relates to a maintenance method, characterised in that it comprises a step for determining the severity according to a method for determining the severity according to the invention, a step for determining the type of mission carried out by the helicopter using the flight data of the helicopter and the mission type model, a step for scheduling maintenance operations based on the severity model associated with said type of determined mission, and a step for carrying out maintenance operations according to said maintenance operation schedule.

A method for scheduling maintenance operations according to the invention allows a maintenance schedule adapted to the severity of the types of mission carried out by the helicopter, and thereby to prepare maintenance operations such as operations for inspecting the wear of a component, or operations for replacing a component. The early scheduling of these maintenance operations further enables preparing the component procurement process.

The invention also relates to a system for monitoring the soundness of helicopters comprising a device for determining the severity of a plurality of flight missions of a plurality of helicopters, characterised in that said device comprises:
 a database comprising the mission flight data of helicopters, said flight data comprising for each flight of a helicopter the physical data recorded by at least one sensor of the helicopter,
 a database comprising the maintenance data of the plurality of helicopters, said maintenance data comprising at least the information relating to failures of the components of each helicopter and to the components that are replaced in each helicopter as a consequence of the flight missions, a module for constructing the mission type, comprising:
   means for constructing relative descriptors, wherein the physical flight data is reduced to a vector with a predetermined dimension forming a descriptor, all of the descriptors having the same dimension,
   means for partitioning the descriptors, adapted to partition the descriptors into sub-sets forming the types of mission,
   means for allocating a type of mission to each flight by associating the descriptor of said flight with the subset wherein the descriptor is located, and for creating a model of the types of mission associating the physical data relating to the flight to each type of mission, a module for interpreting the severity of the types of mission, comprising:
   means for estimating severity models from the flight data and the maintenance data, each severity model defining an estimation of the ageing of the helicopter components based on the types of mission,
   means for associating a severity model to each type of mission determined by the module for constructing the types of mission.

In the whole text, the term "module" is used to describe a software element, a sub-set of a software program that can be compiled separately, either for independent use or to be combined with other modules of a program, or a hardware element, or a combination of a hardware element and a software sub-program. Such a hardware element can comprise an integrated circuit specific to an application (more commonly known as ASIC, for Application-Specific Integrated Circuit), or a programmable logic circuit (more commonly known as FPGA for Field-Programmable Gate Array), or a circuit of specialised microprocessors (more commonly known as DSP for Digital Signal Processor) or any equivalent equipment. In broader terms, a module is therefore an element (software and/or hardware) that allows performing a function.

The system for determining the severity is adapted to implement the method for determining the severity according to the invention.

The method for determining the severity is adapted to be implemented by the system for determining the severity according to the invention.

The invention also relates to a method and a system for determining the severity and to a maintenance scheduling method, characterised in combination by all or some of the characteristics mentioned above or below.

5. LIST OF FIGURES

Other purposes, characteristics and advantages of the invention will appear upon reading the following description, provided by way of an example and not limited thereto, and with reference to the appended drawings, wherein.

6. DETAILED DESCRIPTION OF AN EMBODIMENT OF THE INVENTION

The following embodiments are provided by way of example. Although the description makes reference to one or more embodiments, this does not necessarily mean that each reference is made to the same embodiment, or that the characteristics thereof apply only to one single embodiment. Individual characteristics of different embodiments can also be combined to provide other embodiments. In the figures, the scales and proportions are not strictly respected for purposes of illustration and clarity.

Figure 1:
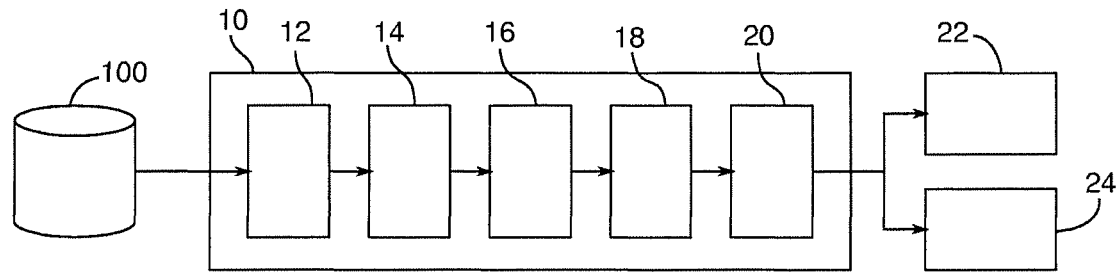
FIG. 1 is a schematic view of a step for constructing the type of mission using a method for determining the severity according to one embodiment of the invention.

FIG. 1 is a schematic view of a step 10 for constructing the type of mission using a method according to one embodiment of the invention.

Step 10 for constructing mission types comprises a sub-step 12 for selecting the physical data from among the physical flight data 100, by removing the recorded physical data relating to the soundness of the helicopter and retaining the physical data relating to the use made of the helicopter. This sub-step sorts through the data such that only the data physically relating to the use made of the helicopter is retained, such that the constructed mission types remain independent from the soundness of the helicopters and depend only on the use that is made thereof.

For example, the data relating to the use made of the engine can be the engine torque during flight phases, which is linked to the commands of the helicopter pilot, in order to change altitude, direction, etc. Similarly, the number of take-offs per flight or per hour of flight relate to the use made of the helicopter. The engine torque data or the number of take-offs therefore relate to the use made of the helicopter.

Conversely, the data relating to the soundness of the engine comprises, for example, the engine temperature/torque ratio, because to achieve a torque required in use, the temperature of the engine will change depending on the soundness thereof (if the engine is unsound, the temperature increases). Likewise, the engine start time is an example of a set of data that relates to the soundness of the helicopter. If it starts too quickly or too slowly, this can indicate that a component is functioning abnormally. This data relating to the soundness of the helicopter is removed in this selection sub-step 12, but it can be used in the step for interpreting the severity, which requires data relating to the soundness of the engine.

The step 10 for constructing the mission type then comprises a sub-step 14 for constructing relative descriptors, wherein each item of physical flight data is reduced to a vector with a predetermined dimension forming a descriptor, all of the descriptors having the same dimension. This descriptor construction allows reducing the dimension of each item of physical data (temperature, pressure, angles, etc.) to one same dimension. A method for performing this construction is, for example, the creation of a histogram for each item of physical data, the values of the physical data being distributed in each class of the histogram so as to be able to create a vector with as many components as there are histogram classes, each component being representative of the number of values in a class of the histogram. The descriptors therefore represent a density of the physical data values.

If the number of dimensions of the descriptors is too big, the step 10 for constructing the mission type comprises an optional sub-step 16 for reducing the dimension of the descriptors prior to the sub-step of allocating the types of mission. This sub-step is in particular performed by a multivariate data analysis of the descriptors, but it is also possible to use any other algorithm for the reduction of the dimension using a metric that corresponds to the specificity of the descriptors, i.e. vectors representing densities of characteristics.

The step 10 for the construction of the type of mission then comprises a sub-step 18 for partitioning the descriptors, adapted to partition the descriptors into sub-sets forming the types of mission. The partitioning methods used are, for example, the K-means method, the DBSCAN method or the mean shift method.

Such that the partitioning methods yield relevant results, it is crucial to use a norm that is adapted to the vectors representing densities. For example, the norm used can be:

the L1 norm (or distance), with the formula:

$$[|X, Y|]_1 = \sum_i |x_i - y_i|$$

the Wasserstein metric (or distance), with the formula:

$$d(X, Y) = \sum_{i=1...n} \left| \sum_{j=1...i} (x_j - y_i) \right|$$

the chi-squared norm (or distance), with the formula:

$$d(X, Y) = \frac{1}{2} \sum_i \frac{(X_i - Y_i)^2}{X_i + Y_i}$$

the Bhattacharyya norm (or distance), with the formula:

$$d(X, Y) = \sum_i \sqrt{x_i y_i}$$

The step 10 for constructing the mission type finally comprises a sub-step 20 for allocating a type of mission 22 to each flight by associating the descriptor of said flight with the subset wherein the descriptor is located, and for creating a model of the type of mission 24 associating the physical data relating to the flight to each type of mission.

Figure 2:
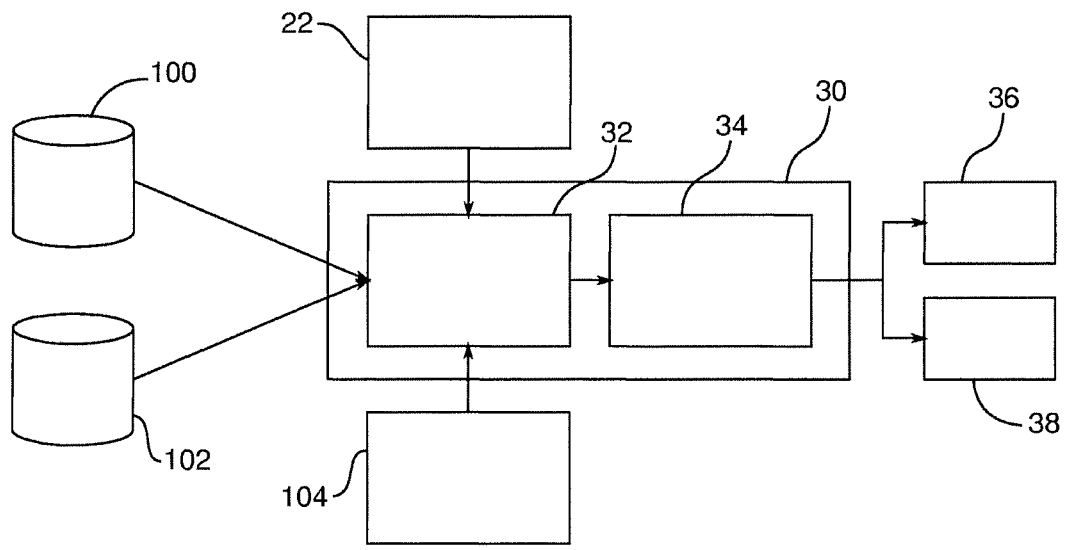
FIG. 2 is a schematic view of a step for interpreting the severity of the types of mission using a method for determining the severity according to one embodiment of the invention.

The method according to the invention comprises, after step 10 for constructing the type of mission, a step for interpreting the severity of the types of mission. FIG. 2 is a view of such a step 30 for interpreting the severity of types of mission using a method according to one embodiment of the invention.

The step 30 for interpreting the severity of the types of mission comprises a sub-step 32 for estimating severity models from the flight data 100 and the maintenance data 102, each severity model defining an estimation of the ageing of the helicopter components based on the types of mission 22. This sub-step can also use the data 104 of activity rules, such as the statistics relating to the number of cycles for a revolution speed of the engine, for example. An activity rule is a rule stemming from the experience of the user. In this example, an activity rule can consist of examining the statistics relating to the speed levels reached during the flight and transforming these into a counter. The counter being linked to the notion of severity, for example, a part is deemed as worn if it exceeds a counter threshold of 1000 for instance.

The step 30 for interpreting the severity of mission types then comprises a sub-step 34 for associating a severity model to each type of mission determined in the step for constructing the types of mission. The step sends back severity types 36 and the severity model 38.

Figure 3:
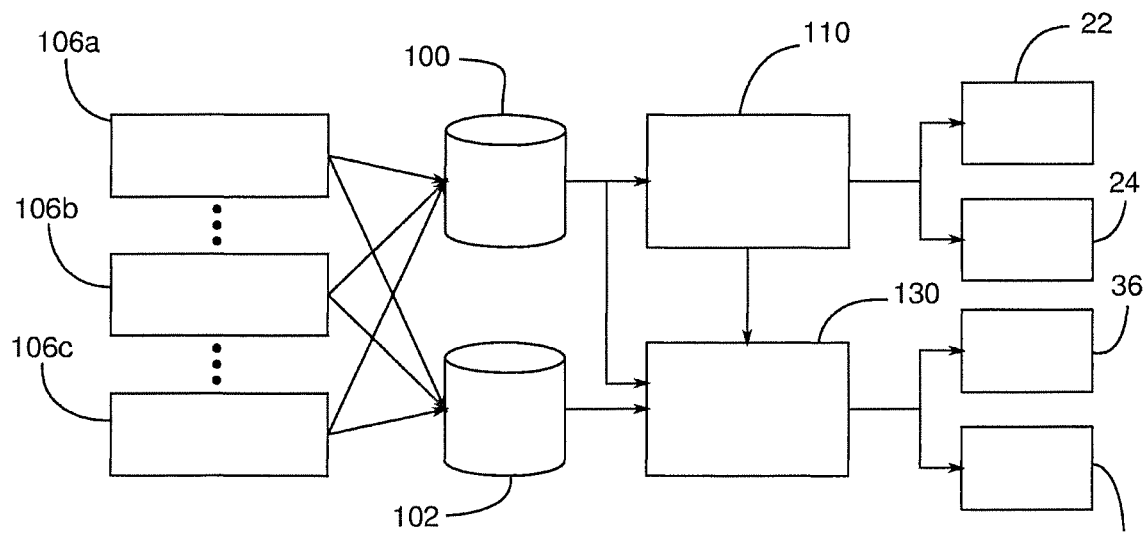
FIG. 3 is a schematic view of a system for determining the severity according to one embodiment of the invention.

FIG. 3 schematically shows a system for determining the severity of a plurality of flight missions of a plurality of helicopters adapted to implement the severity determination method described above.

In particular, the system comprises a flight database 100 containing flight data and a maintenance database 102 containing maintenance data, retrieving the flight and maintenance data from a plurality of helicopters 106a, 106b, 106c, etc.

The flight data from the flight database 100 is used in a module 110 for the construction of the mission type, comprising means to implement the sub-steps for the construction of the mission type described above, with reference to FIG. 1, so as to provide a set of mission types 22 and a mission model 24.

The same flight data from the flight database 100 and the maintenance data from the maintenance database 102 is used in a module 130 for interpreting the severity of mission types, comprising means to implement the sub-steps for interpreting the severity of mission types described above, with reference to FIG. 2, so as to provide a set of severity types 36 and a severity model 38.

The invention claimed is:

1. Method for monitoring the soundness of helicopters comprising the determination of the severity of a plurality of flight missions of a plurality of helicopters, said determination comprising:

a step for the acquisition and storage of mission flight data of helicopters, said flight data comprising for each flight of a helicopter the physical data recorded by at least one sensor of the helicopter, a step for the acquisition and storage of the maintenance data of the plurality of helicopters, said maintenance data comprising at least the information relating to failures of the components of each helicopter and to the components that are replaced in each helicopter as a consequence of the flight missions, the method comprising:

a step for constructing the mission type, comprising:

a sub-step for constructing relative descriptors, wherein the physical flight data is reduced to a vector with a predetermined dimension forming a descriptor, all of the descriptors having the same dimension, a sub-step for partitioning the descriptors, adapted to partition the descriptors into sub-sets forming the types of mission, a sub-step for allocating a type of mission to each flight by associating the descriptor of said flight with the subset wherein the descriptor is located, and for creating a model of the types of mission associating the physical data relating to the flight to each type of mission, a step for interpreting the severity of the types of mission, comprising:

a sub-step for estimating severity models from the flight data and the maintenance data, each severity model defining an estimation of the ageing of the helicopter components based on the types of mission, a sub-step for associating a severity model to each type of mission determined in the step for constructing the types of mission.

2. The method for monitoring the soundness of helicopters according to claim 1, wherein the step for constructing mission types comprises a sub-step for selecting the physical data from among the physical flight data, prior to the sub-step for constructing descriptors, by removing the recorded physical data relating to the soundness of the helicopter engine and retaining the physical data relating to the engine use.

3. The method for monitoring the soundness of helicopters according to claim 1, wherein the step for constructing the type of mission comprises a sub-step for reducing the dimension of the descriptors prior to the sub-step for allocating the types of mission, through a multivariate data analysis of the descriptors.

4. The method for monitoring the soundness of helicopters according to claim 3, wherein the descriptor dimension reduction sub-step is performed with a method selected from among the following methods:
principal component analysis,
autoencoder method,
ISOMAP method
T-SNE method,
multi-dimensional scaling,
Linear Local Embedding method.

5. The method for monitoring the soundness of helicopters according to claim 1, wherein the step for constructing the type of mission comprises a sub-step for standardising the descriptors prior to the sub-step for partitioning the descriptors.

6. The method for monitoring the soundness of helicopters according to claim 5, wherein the sub-step for standardising the descriptors performs a standardisation selected from among the following standardisation methods:
L1 norm,
Wasserstein metric,
chi-squared norm,
Bhattacharyya distance.

7. The method for monitoring the soundness of helicopters according to claim 1, wherein the sub-step for partitioning performs a partitioning selected from among the following partitioning methods:
K-means method,
DBSCAN method,
mean deviation method.

8. The method for monitoring the soundness of helicopters according to claim 1, wherein the sub-step for constructing relative descriptors comprises the creation, for each type of physical data, of a histogram comprising a predetermined number n of classes, the descriptor forming a vector of dimension n, of which each component is equal to the number of items of physical data comprised in a class of the histogram.

9. The helicopter maintenance method comprising a step for determining the severity using a method for determining the severity according to claim 1 and a step of determining the type of mission carried out by the helicopter from the flight data of the helicopter and the mission type model, and a step for scheduling maintenance operations based on the severity model associated with said type of determined mission, and a step for carrying out maintenance operations according to said maintenance operation schedule.

10. System for monitoring the soundness of helicopters comprising a device for determining the severity of a plurality of flight missions of a plurality of helicopters, wherein said device comprises:
a database comprising mission flight data of helicopters, said flight data comprising for each flight of a helicopter the physical data recorded by at least one sensor of the helicopter,
a database comprising the maintenance data of the plurality of helicopters, said maintenance data comprising at least the information relating to failures of the components of each helicopter and to the components that are replaced in each helicopter as a consequence of the flight missions,
a module for constructing the mission type, comprising:
means for constructing relative descriptors, wherein the physical flight data is reduced to a vector with a predetermined dimension forming a descriptor, all of the descriptors having the same dimension,
means for partitioning the descriptors, adapted to partition the descriptors into sub-sets forming the types of mission,
means for allocating a type of mission to each flight by associating the descriptor of said flight with the subset wherein the descriptor is located, and for creating a model of the types of mission associating the physical data relating to the flight to each type of mission,
a module for interpreting the severity of the types of mission, comprising:
means for estimating severity models from the flight data and the maintenance data, each severity model defining an estimation of the ageing of the helicopter components based on the types of mission,
means for associating a severity model to each type of mission determined by the module for constructing the types of mission.

* * * * *